United States Patent
Chen et al.

(10) Patent No.: US 7,344,579 B2
(45) Date of Patent: Mar. 18, 2008

(54) PIPE TRAP

(75) Inventors: Ping-Yang Chen, Miaoli County (TW); Chih-Peng Liao, Hsinchu County (TW); Chin-Chi Chen, Hsinchu (TW); Shu-Ming Kuo, Kaosiung County (TW); Yi-Chang Yang, Hsinchu (TW); Jui-Yuan Lin, Hsinchu (TW)

(73) Assignee: Powerchip Semiconductor Corp., Hsinchu (TW)

( * ) Notice: Subject to any disclaimer, the term of this patent is extended or adjusted under 35 U.S.C. 154(b) by 373 days.

(21) Appl. No.: 10/709,607

(22) Filed: May 18, 2004

(65) Prior Publication Data

US 2005/0144915 A1   Jul. 7, 2005

(51) Int. Cl.
*B01D 29/00* (2006.01)
*B01D 35/00* (2006.01)
*B01D 25/18* (2006.01)
*B01D 29/46* (2006.01)
*B01D 15/00* (2006.01)
*C02F 1/40* (2006.01)

(52) U.S. Cl. ............... 55/482; 210/315; 210/316; 210/317; 210/338; 210/342; 210/488; 210/DIG. 5; 95/286; 95/287; 95/268; 95/320; 95/321; 95/323; 95/327; 95/330; 137/171

(58) Field of Classification Search .......... 55/482; 210/315–317, 338–342, 488, DIG. 5; 95/286–287, 95/268, 320, 321, 323, 327, 330, 482, 485; 137/171
See application file for complete search history.

(56) References Cited

U.S. PATENT DOCUMENTS

| | | | | | |
|---|---|---|---|---|---|
| 2,929,464 | A | * | 3/1960 | Sprouse | 55/488 |
| 3,413,778 | A | * | 12/1968 | Lavery et al. | 96/190 |
| 3,648,843 | A | * | 3/1972 | Pearson | 210/443 |
| 4,642,182 | A | * | 2/1987 | Drori | 210/232 |
| 5,401,404 | A | * | 3/1995 | Strauss | 210/265 |
| 6,858,051 | B2 | * | 2/2005 | Uhlenbrock | 55/321 |

FOREIGN PATENT DOCUMENTS

| | | |
|---|---|---|
| JP | 50-122768 | 9/1975 |
| JP | 54-72578 | 6/1979 |
| JP | 59-132911 | 7/1984 |
| JP | 5-92114 | 4/1993 |
| JP | 6-182120 | 7/1994 |
| JP | 7-146035 | 6/1995 |
| JP | 8-126694 | 5/1996 |
| JP | 8-175676 | 7/1996 |
| JP | 8-186066 | 7/1996 |
| JP | 2000-102707 | 4/2000 |
| JP | 2002-045626 | 2/2002 |
| JP | 2002-143618 | 5/2002 |

* cited by examiner

*Primary Examiner*—Duane Smith
*Assistant Examiner*—Ives Wu
(74) *Attorney, Agent, or Firm*—Jianq Chyun IP Office

(57) ABSTRACT

A pipe trap comprising a body, a disc filter, a pipe and a plurality of mesh filter suitable for filtering gases is provided. The pipe trap body has a gas inlet and a gas outlet. The disc filter and the mesh filters are enclosed inside the pipe trap body. One end of the pipe connects with the disc filter and the other end of the pipe connects with the gas outlet. The mesh filters are enclosed inside the pipe. Using a multi-stage filtering method, liquid matter separates out first and then gaseous particles are filtered according to the particle size so that the pipe trap has a high filtering efficiency.

17 Claims, 5 Drawing Sheets

PIPE TRAP

CROSS REFERENCE TO RELATED APPLICATIONS

This application claims the priority benefit of Taiwan application Ser. No. 93100195, filed on Jan. 6, 2004.

BACKGROUND OF INVENTION

1. Field of the Invention

The present invention relates to a pipe trap. More particularly, the present invention relates to a pipe trap for a chemical vapor deposition system.

2. Description of the Related Art

Chemical vapor deposition (CVD) is a thin film deposition technique for forming a layer over a chip. In the CVD process, chemical reactants (in general, reactive gases) react inside a reaction chamber (or furnace) to form solid product on chips. Chemical vapor deposition has a wide application in the fabrication thin films on semiconductor devices. In general, conductive, semi-conductive or dielectric films are fabricated by performing chemical vapor deposition processes. Furthermore, because the material for forming the thin film layer in a chemical vapor deposition is formed by reacting reactive gases, both the crystallinity and stoichiometry of the thin film layer are better than one formed by a conventional sputtering method. Hence, chemical vapor deposition has become the principal thin film deposition tool in advance semiconductor production facility.

However, when the reactive gases react to form solid material in a chemical vapor deposition process, a large amount of reactive material particles and byproducts is also produced. Thus, the reaction chamber (or furnace) is usually linked to a disc trap for filtering the reactive material particles and byproducts within the gaseous exhaust.

FIG. 1 is a section view showing the structure of a conventional disc trap linked to the reaction chamber (furnace) of a chemical vapor deposition system. As shown in FIG. 1, the disc trap 100 mainly comprises a disc trap body 110, a filtering plate 120 and a disc filter 130. The disc trap body 110 further comprises a base 112, a tube body 114 and a fixed shaft 116. The tube body 114 is set up over the base 112. The tube body 114 has a gas inlet 114a and a gas outlet 114b. The fixed shaft 116 is set up on the base 112. The filtering plate 120 is set up inside the tube body 114 facing the gas inlet 114a. The filtering plate 120 has a plurality of pores (not shown) for filtering reactive material particles within the gaseous exhaust. The disc filter 130 comprises a plurality of ring-shaped discs 132. The ring-shaped discs 132 are stacked together on top of the base 112 to form a hollow tube.

When exhaust containing reactive material particles and reaction byproducts enter into the disc trap body 110 via the gas inlet 114a, a portion of the gases will pass through the filtering plate 120 into the disc filter 130 while the remaining portion will pass directly into the disc filter 130. For the gases that pass through the filtering plate 120, reactive material particles having a size greater than the pores in the filtering plate 120 are trapped. Furthermore, there are gaps between the discs 132 of the disc filter 130. Therefore, the disc filter 130 is able to trap reactive material particles in the gases having a size bigger than the gap so that most reactive material particles or impurities are removed when the gases exhaust from the gas outlet 114b.

However, the conventional disc trap has the following disadvantages:

1. The exhaust gases entering the disc trap from the gas inlet travel directly to the disc filter so that the gas flow path is rather short. Since it is difficult to retain the reactive material within the exhaust within the disc trap for a longer period, the filtering efficiency is low.

2. Although the disc filter has the capacity to hold back reactive material particles having a relatively large diameter, reactive material particles having a smaller diameter are free to go. Hence, the disc trap is a poor filter for small particles.

3. The filtering plate is adjacent to the gas inlet of the disc trap. In fact, the filtering plate and the gas inlet separate from each other by 1.5 cm only. Furthermore, the pores on the filtering plate are relatively small. If the exhaust gases contain a large quantity of reactive material particles and byproducts, some of the pores may be blocked by the particles and hence the gas inlet is choked. When the gas inlet of the disc trap is choked, time and money must be spent to decongest the inlet. Ultimately, productivity of the chemical vapor deposition system will drop.

SUMMARY OF INVENTION

Accordingly, at least one objective of the present invention is to provide a pipe trap having a greater capacity for filtering out liquid state material and micro-particles from a gaseous exhaust.

At least a second objective of the present invention is to provide a pipe trap with a design that prevent the frequent obstruction of the gas inlet, thereby extending the life span of the pipe trap.

To achieve these and other advantages and in accordance with the purpose of the invention, as embodied and broadly described herein, the invention provides a pipe trap for filtering gaseous exhaust. The pipe trap mainly comprises a pipe trap body, a disc filter, a pipe and a plurality of mesh filters. The pipe trap body is a hollow body having a gas inlet and a gas outlet. The disc filter is set up inside the pipe trap body. The pipe is also set up inside the pipe trap body with one end of the pipe linked to the disc filter while the other end of the pipe linked to the gas outlet. Moreover, a portion of the pipe is located close to the gas inlet. The mesh filters are set up inside the pipe. Exhaust gases enter the pipe trap through the gas inlet and diffuse into the disc filter from the exterior sidewall of the pipe. After passing through the disc filters, the gases exit through the gas outlet.

In one embodiment of the present invention, the pipe trap body comprises a base and a tube body. The tube body sits on the base. The gas inlet and the gas outlet are formed on the tube body. Furthermore, the gas inlet is set up on one side of the tube body and the gas outlet is set up on the top surface of the tube body.

In one embodiment of the present invention, the pipe trap body further comprises a fixed shaft set up on the base. The mesh filters are set up on the fixed shaft so that mesh filters are stationed inside the pipe. Furthermore, the periphery of the mesh filters may have a plurality of fastening elements for fastening the mesh filters into an integrated unit to facilitate the simultaneous mounting of all the mesh filters on the shaft.

In one embodiment of the present invention, the disc filter comprises a plurality of ring-shaped discs. The ring-shaped discs stack on the base. The pipe is set up over the disc filter. Furthermore, the upper and lower surface of each ring-shaped disc has minute grooves running from the outer periphery to the inner periphery so that every gap of neighboring discs has a series of intricate gaps between their surfaces when the ring-shaped discs are stacked together. Hence, particles within a gas may be trapped and accumulated inside the gaps between every gap of adjacent discs. In addition, a plurality of spines or grooves may also be formed on the upper and lower surface of the ring-shaped discs to increase absorption surface area.

In one embodiment of the present invention, the ring-shaped discs stack up to produce a hollow stacked body. In addition, the ring-shaped discs have an alignment edge for aligning the stack of ring-shaped discs. Alternatively, some of the ring-shaped discs may stack over each other with all their alignment edges facing a first direction while some of the ring-shaped discs may stack over each other with all their alignment edges facing a second direction. In other words, the ring-shaped discs may stack together with their alignment edges all facing the same direction or some facing one direction and others facing an opposite direction.

In one preferred embodiment of the present invention, the pipe has a flat surface facing the gas inlet for changing the flow direction of a portion of the gases at the gas inlet and absorbing some of liquid material within the gases. Furthermore, the portion of the pipe facing the gas inlet may include a plurality of partition plates for increasing the absorbing surface area and hence enhancing the capacity to absorb liquid material in the gases. Obviously, the partition plates may also be positioned around the entire outer wall of the pipe.

In one preferred embodiment of the present invention, the distance from the wall of the pipe trap body close to the gas inlet to the pipe section facing the gas inlet is set to 3 cm, for example.

In one preferred embodiment of the present invention, the pore diameter in each mesh filter is different. Furthermore, the mesh filters are laid out from the disc filter to the gas outlet of the pipe trap body such that the pore diameter of the mesh filters decrease towards the gas outlet.

In brief, the pipe trap of the present invention has three filtering elements including a disc filter, a pipe and a mesh filter. Gaseous exhaust entering the pipe trap from the gas inlet passes sequentially through the pipe, the disc filter and the mesh filter before exiting the pipe trap through the gas outlet. Using this three-stage pipe trap, liquid material within the gases is absorbed first and then followed by micro-particles of decreasing diameters. Ultimately, a higher filtering efficiency is obtained.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
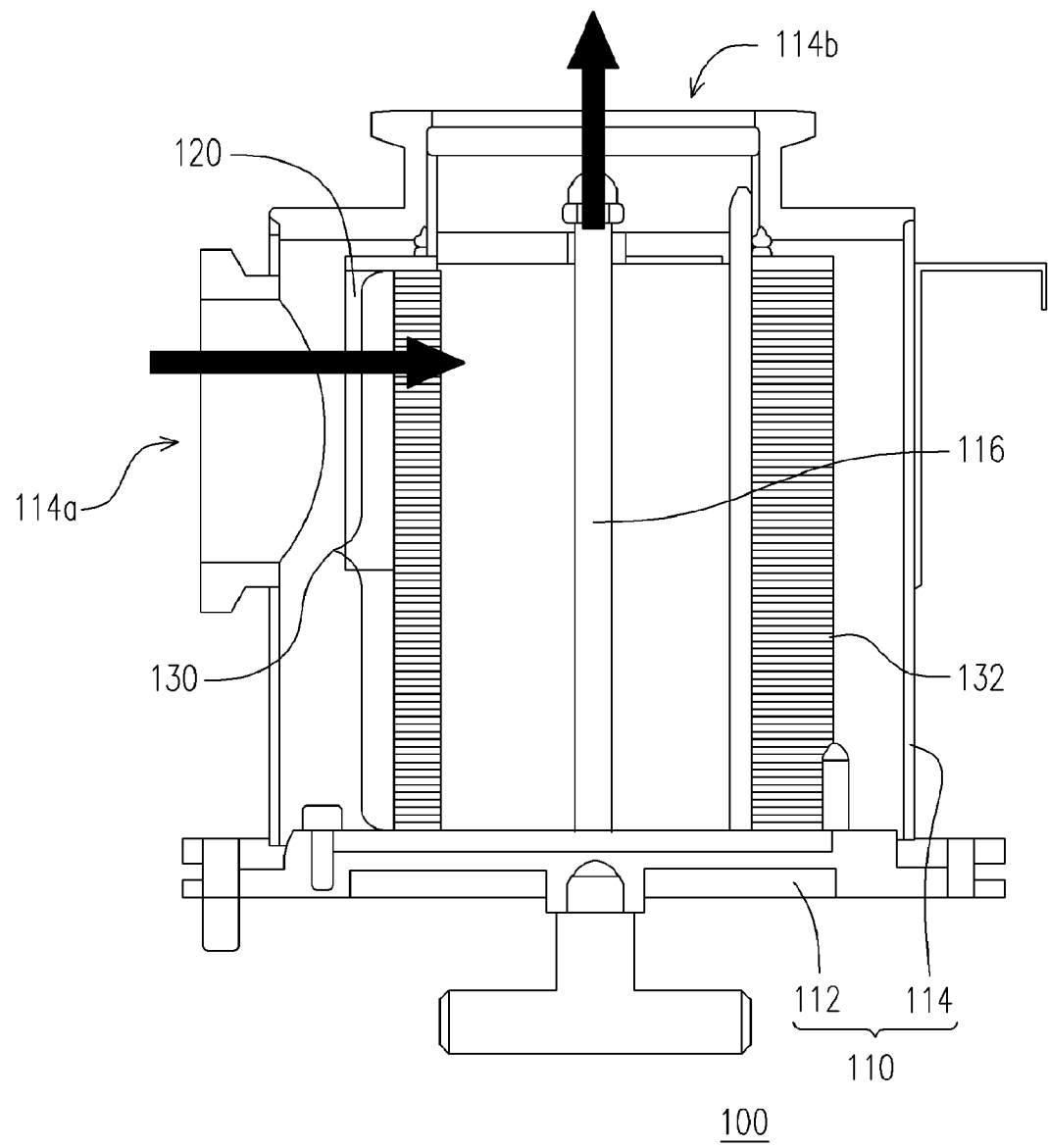
FIG. 1 is a section view showing the structure of a conventional pipe trap linked to the reaction chamber (furnace) of a chemical vapor deposition system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
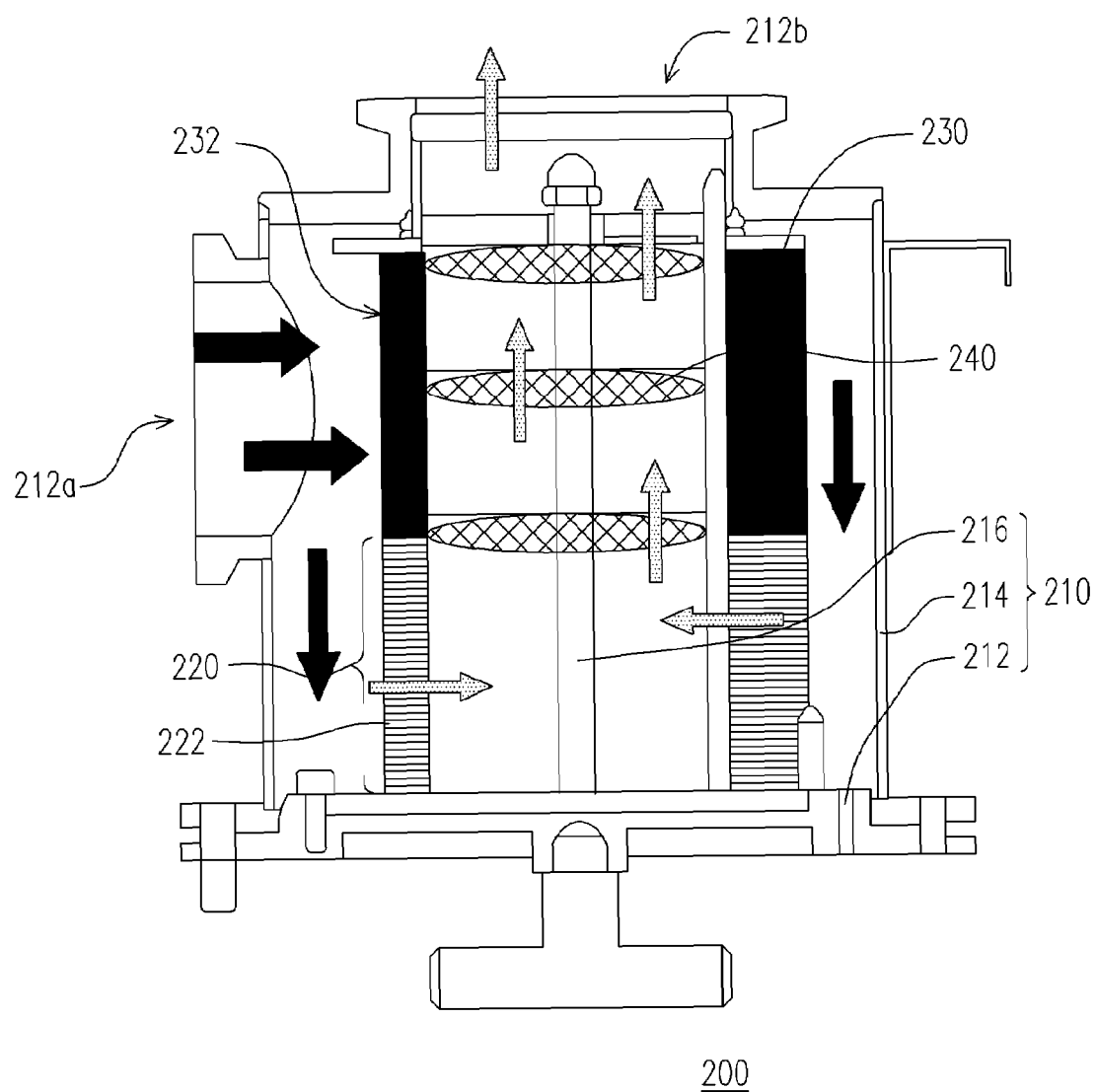
FIG. 2 is a schematic cross-sectional view showing the internal structure of a pipe trap according to one preferred embodiment of the present invention.
Figure 3A:
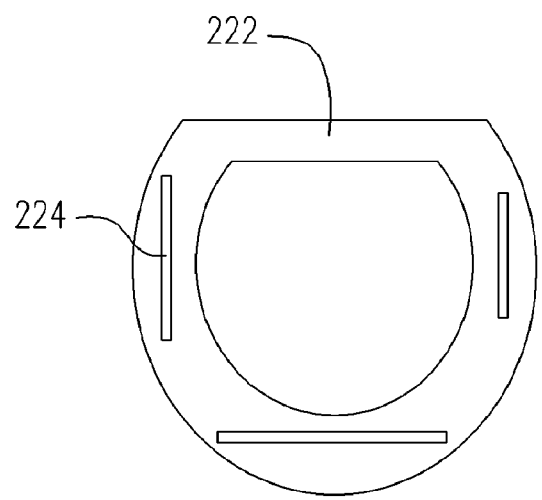
FIG. 3A is a top view of the disc filter for the pipe trap according to the preferred embodiment of the present invention.
Figure 3B:
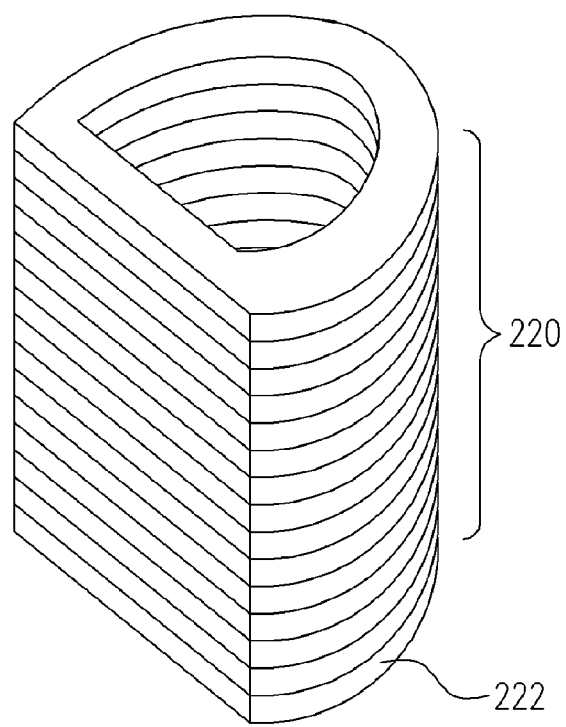
FIG. 3B is a perspective view of the disc filter for the pipe trap according to the preferred embodiment of the present invention.
Figure 4A:
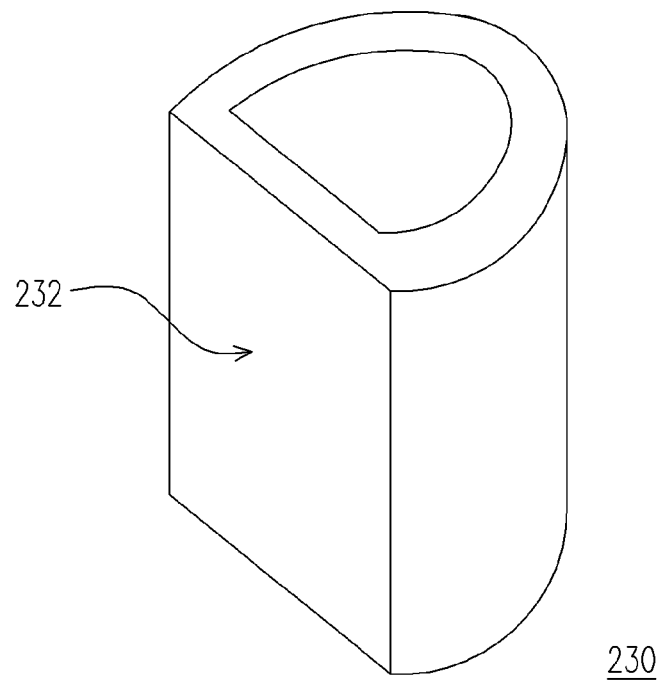
FIG. 4A is a perspective view of the pipe for the pipe trap according to the preferred embodiment of the present invention.
Figure 4B:
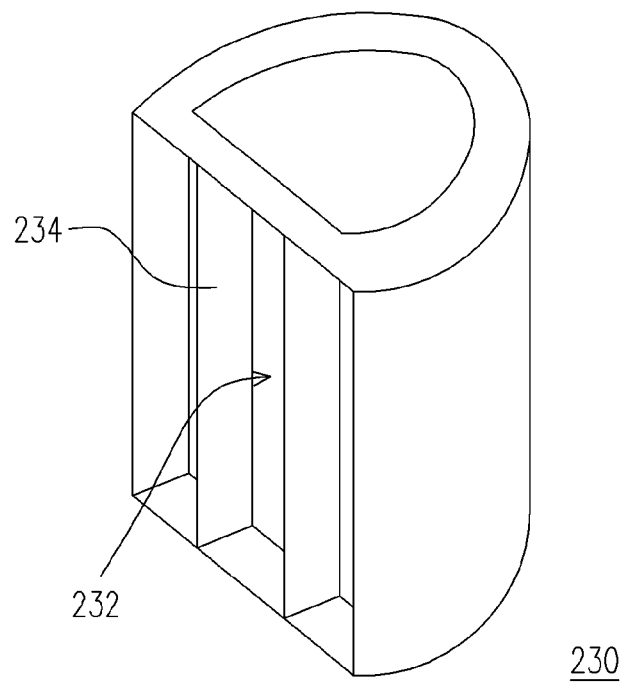
FIG. 4B is a perspective view of another pipe for the pipe trap according to the preferred embodiment of the present invention.
Figure 5:
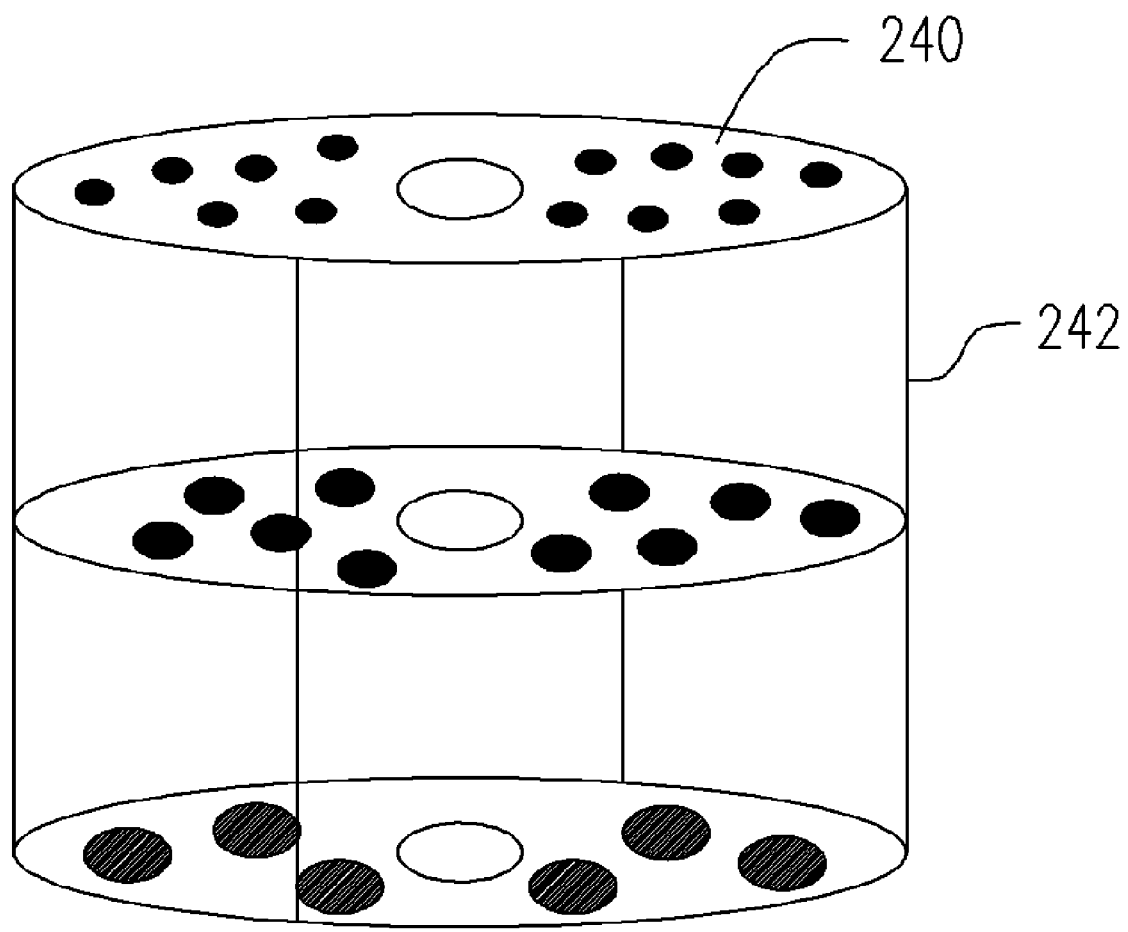
FIG. 5 is a perspective view of the mesh filter for the pipe trap according to the preferred embodiment of the present invention.

FIG. 2 is a schematic cross-sectional view showing the internal structure of a pipe trap according to one preferred embodiment of the present invention. FIG. 3A is a top view of the disc filter for the pipe trap according to the preferred embodiment of the present invention. FIG. 3B is a perspective view of the disc filter for the pipe trap according to the preferred embodiment of the present invention. FIG. 4A is a perspective view of the pipe for the pipe trap according to the preferred embodiment of the present invention. FIG. 4B is a perspective view of another pipe for the pipe trap according to the preferred embodiment of the present invention. FIG. 5 is a perspective view of the mesh filter for the pipe trap according to the preferred embodiment of the present invention.

As shown in FIG. 2, the pipe trap 200 is suitable for filtering out micro-particles and liquid material suspended in a gaseous mixture. The pipe trap 200 mainly comprises a pipe trap body 210, a disc filter 220, a pipe 230 and a plurality of mesh filters 240.

The pipe trap body 210 is a hollow body having a gas inlet 212*a* and a gas outlet 212*b*. In this embodiment, the pipe trap body 210 comprises a base 212, a tube body 214 and a fixed shaft 216, for example. The tube body 214 and the fixed shaft 216 are set up on the base 212. The gas inlet 212*a* is formed on one side of the tube body 214 and the gas outlet 212*a* is formed at the top surface of the tube body 214. In this embodiment, the tube body 214 is a cylindrical body, for example. Obviously, the tube body 214 can be a rectangular tube, a pentagonal tube or a polygonal tube, for example.

As shown in FIGS. 2, 3A and 3B, the disc filter 220 is set up inside the pipe trap 210 over the base 212. The disc filter 220 mainly comprises a stack of ring-shaped discs 222 so that a hollow space is created in the middle. In this embodiment, the discs 222 are stacked on the base 212. The pipe 230 is also set up inside the pipe trap body 210 resting on the topmost disc 222 of the stack. The upper and lower surface of each disc 222 has a plurality of minute grooves (not shown) running from the outer periphery to the inner periphery. When the discs 222 are stacked together, the grooves on the contact surfaces of every gap of neighboring discs 222 cross over each other at various angles to form intricate gaps. As gaseous exhaust enters the disc filter 220 through these gaps, suspended micro-particles are trapped within the gaps. In addition, a plurality of spines 224 may be fabricated on the upper and lower surfaces of each disc 222 to increase absorbing surface area and enhance the filtering capacity. Similarly, a plurality of grooves (not shown) may be fabricated on the upper and lower surfaces of each disc 222 to increase absorbing surface area and enhance the filtering capacity. Furthermore, each disc 222 according to the present embodiment has an alignment edge for aligning the discs 222 to form a stack. As shown in FIG. 3B, the alignment edge of the disc 222 is a cut surface. The ring-shaped discs 222 are stacked together by aligning their alignment edges. Obviously, some of the ring-shaped discs can be aligned with their alignment edges facing a first direction while the remaining ring-shaped discs 222 are aligned with their alignment edges facing a second direction. In other words, the ring-shaped discs 222 may stack together with their alignment edges all facing the same direction, some alignment edges facing one direction and others facing an opposite direction, the alignment edges alternately positioned or the alignment edge of each disc 222 freely set. Moreover, there is no restriction on the shape of the discs 222. The discs 222 can have a circular, polygonal or other irregular shape.

As shown in FIGS. 2 and 4A, the pipe 230 is a hollow tube with an area 232 that faces the gas inlet 212a. The area 232 facing the gas inlet 212a is a flat surface (as shown in FIG. 4A) for changing the flow direction of gases coming in from the gas inlet 212a and absorbing liquid material within the gases. In addition, the distance from the wall of the pipe trap body 210 close to the gas inlet 212a to the pipe area 232 is set to 3 cm, for example. Hence, the pipe 230 is set up over the disc filter 220 such that one end is linked to the disc filter 220, the other end is linked to the gas outlet 212b and the pipe area 232 on the pipe 230 is positioned to face the gas inlet 212a.

As shown in FIG. 4B, the area 232 on the pipe 230 facing the gas inlet 212a are designed to have a flat surface. In addition, the area 232 may include a plurality of partition plates 234 for increasing the absorbing surface area and the capacity for absorbing liquid material in the gases. Obviously, the partition plates 234 are just not limited to the flat area 232 of the pipe 230. For example, the partition plates 234 can be formed on all the walls around the pipe 230. In addition, although the partition plates 234 are vertically positioned on the pipe 230, the partition plates 234 can be positioned horizontally or in other types of orientation. Moreover, there is no restriction on the shape and size of each partition plate 234.

As shown in FIGS. 2 and 5, a plurality of mesh filters 240 (only three are shown) is set up inside the pipe 230. The mesh filters 240 slide into the fixed shaft 216 and station inside the pipe 230. To facilitate the positioning of these mesh filters 240 on the fixed shaft 216, the edge of each mesh filter 240 has a plurality of fastening elements 242 so that all the mesh filters 240 are joined together to form an integrated unit.

To illustrate the operation of the pipe trap 200, its application in a silicon dioxide chemical vapor deposition process (using tetra-ethyl-ortho-silicate (TEOS) as the reactive gas) is described. The pipe trap 200 of the present invention is connected to the gas exhaust outlet of a chemical vapor deposition chamber (furnace). To perform the chemical vapor deposition, a reactive gas TEOS ($Si(OC_2H_5)_4$ (g)) is passed into the reaction chamber (furnace). By heating the reactive gas, solid silicon dioxide ($SiO_2$ (s)) are formed and deposited on a wafer surface. As the reactive gas is transformed into solid silicon dioxide, a large amount of reactive material particles and byproducts such as ethylene ($C_2H_4$ (g)), water ($H_2O$ (g)) is also produced. The pipe filter 200 at the gas exhaust outlet of the reaction chamber is specifically used to filter the reactive material particles and the byproducts.

When the exhaust enters the pipe trap body 210 through gas inlet 212a, it first comes in contact with the area 232 of the pipe 230 as shown in FIG. 4A or FIG. 4B so that the liquid state material (water $H_2O$ (g)) is absorbed. Through the flat surface design of the area 232 of the pipe 230, a portion of the reactive gases travels down towards the bottom section of the pipe trap body 210 to enter the disc filter 220. Another portion of the exhaust is redirected by the arc surface outside the area 232 of the pipe 230 to move away from the gas inlet 212a before traveling down towards the bottom section of the pipe trap body 210 to enter the disc filter 220. The pipe 230 inside the pipe trap body 210 not only serves as a first filter for absorbing liquid state material from the exhaust, but also increases the flow path of exhaust inside the pipe trap body 210. With a longer flow path, the chance of reactive material retained inside the pipe trap body 210 is increased and the filtering capacity is improved. Furthermore, the distance from the wall of the pipe trap body 210 adjacent to the gas inlet 212a to the area 232 of the pipe 230 is set to 3 cm, roughly twice the distance from the pipe trap body to the filtering plate in a conventional pipe trap. Therefore, the jamming of the gas inlet due to too much accumulation of reactive material particles and byproducts can be avoided. In other words, there is no need to spend a lot of time to clean up the gas inlet of a pipe trap. Ultimately, productivity of the chemical vapor deposition system is improved.

Because of the numerous gaps between adjacent discs 222 in the disc filter 220, the disc filter 220 serves as a second filter for removing reactive particles within the exhaust gases having a diameter greater than the gaps. Thereafter, the exhaust gases will pass through the mesh filters 240 within the pipe 230 sequentially. It should be noted that the diameter of pores in each of the three mesh filters 240 in FIG. 5 is different. The mesh filters 240 are set such that the mesh filter with smaller pores are closer to the gas outlet 212b so that the gases are filtered incrementally. In other words, the mesh filters 240 remove increasing fine reactive material particles so that the gas exiting from the gas outlet 212b contains the fewest and smallest reactive material particles and byproducts.

Accordingly, the pipe trap of the present invention has three filtering units including a disc filter, a pipe and a mesh filter. Gaseous exhaust entering the pipe trap from the gas inlet passes sequentially through the pipe, the disc filter and the mesh filter before exiting the pipe trap through the gas outlet. Using this three-stage pipe trap, liquid material within the gases is absorbed first and then followed by micro-particles of decreasing diameters. Ultimately, a higher filtering efficiency is obtained.

In summary, major advantages of the pipe trap according to the present invention includes:

1. The pipe trap has three filtering units including a disc filter, a pipe and a mesh filter. Through the three-stage filtering pipe trap, more and finer reactive material particles and byproducts are removed so that filtering efficiency is improved.

2. The pipe within the pipe trap not only removes liquid state material from a gaseous exhaust, but also extends the gas flow pathway within the pipe trap body. Because reactive material is easier to trap, overall filtering capacity is increased.

3. The distance from the wall of the pipe trap body adjacent to the gas inlet to the pipe is increased to 3 cm (a big increase in buffering space). Hence, the jamming of the gas inlet due to too much accumulation of reactive material particles and byproducts can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A pipe trap for filtering gaseous exhaust, comprising:
a pipe trap body with a base, a gas inlet, a gas outlet and a hollow interior;
a disc filter set up directly on the base and inside the pipe trap body;
a pipe set up inside the pipe trap body with one end linked to the disc filter and the other end linked to the gas outlet, wherein an area on the pipe faces the gas inlet, and the pipe is setup on top of the disc filter; and
a plurality of mesh filters set up inside the pipe,
wherein the gaseous exhaust enters the pipe trap from the gas inlet, passes through the outer wall of the pipe into the disc filter interior, and travels through the mesh filters sequentially before emerging from the pipe trap via the gas outlet.

2. The pipe trap of claim 1, wherein the pipe trap body further comprises:
a tube body set up on the base, wherein the gas inlet and the gas outlet are formed on the tube body.

3. The pipe trap of claim 2, wherein the gas inlet is formed on one side of the tube body and the gas outlet is formed on the top surface of the tube body.

4. The pipe trap of claim 2, wherein the pipe trap body further comprises a fixed shaft set up on the base for mounting and fastening the mesh filters inside the pipe.

5. The pipe trap of claim 4, wherein the disc filter further comprises a plurality of ring-shaped discs stacked up on the base.

6. The pipe trap of claim 5, wherein the upper and lower surface of the ring-shaped disc have a plurality of minute grooves running from inner periphery to the outer periphery of the disc.

7. The pipe trap of claim 5, wherein the upper and lower surfaces of the ring-shaped disc further comprises a plurality of spines.

8. The pipe trap of claim 5, wherein the upper and lower surfaces of the ring-shaped disc further comprises a plurality of grooves.

9. The pipe trap of claim 5, wherein the ring-shaped discs are stacked together to form a tube-shaped body.

10. The pipe trap of claim 5, wherein each ring-shaped disc has an alignment edge such that all the ring-shaped discs are stacked with all the alignment edges aligned.

11. The pipe trap of claim 5, wherein each ring-shaped disc has an alignment edge, and portion of the ring-shaped discs are aligned through their alignment edges in a first direction and another portion of the ring-shaped discs are aligned through their alignment edges in a second direction.

12. The pipe trap of claim 1, wherein the area on the pipe has a planar surface.

13. The pipe trap of claim 12, wherein the pipe trap further comprises a plurality of partition plates set up on the planar surface of the pipe.

14. The pipe trap of claim 1, wherein the pipe trap further comprises a plurality of partition plates set up on the outer wall of the pipe.

15. The pipe trap of claim 1, wherein the distance from the interior wall of the pipe trap body close to the gas inlet to the area on the pipe is set to 3 cm.

16. The pipe trap of claim 1, wherein the diameter of pores in each mesh filter is different and the mesh filters are laid such that the diameter of pores decreases from the disc filter towards the gas outlet.

17. The pipe trap of claim 1, wherein the pipe trap further comprises a plurality of fastening elements set up on the edges of each mesh filter so that the mesh filters can be joined together to form an integrated unit.

* * * * *